US012605238B2

(12) United States Patent
Boersma et al.

(10) Patent No.: US 12,605,238 B2
(45) Date of Patent: Apr. 21, 2026

(54) ORAL IRRIGATOR WITH BACK FLOW PREVENTION

(71) Applicant: KONINKLIJKE PHILIPS N.V., Eindhoven (NL)

(72) Inventors: Joldert Maria Boersma, Zuidhorn (NL); Jason Daniel Miller, Seattle, WA (US); Jay Wolfer, Kirkland, WA (US); Le Gia Pham, Bellevue, WA (US); Egbert Van De Veen, Ijsselmuiden (NL); Jose Villar, Lake Forest Park, WA (US); Aaldert Geert Zijlstra, Zuidlaren (NL); Klaas Kooijker, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1118 days.

(21) Appl. No.: 17/630,587

(22) PCT Filed: Jul. 24, 2020

(86) PCT No.: PCT/EP2020/070938
§ 371 (c)(1),
(2) Date: Jan. 27, 2022

(87) PCT Pub. No.: WO2021/018764
PCT Pub. Date: Feb. 4, 2021

(65) Prior Publication Data
US 2022/0249212 A1 Aug. 11, 2022

Related U.S. Application Data

(60) Provisional application No. 62/880,175, filed on Jul. 30, 2019.

(51) Int. Cl.
*A61C 17/02* (2006.01)

(52) U.S. Cl.
CPC ................................. *A61C 17/0202* (2013.01)

(58) Field of Classification Search
CPC ... A61C 17/0202; A61C 17/02; F16K 15/025; F16K 15/026; F16K 15/063602; F16K 15/063
See application file for complete search history.

(56) References Cited

U.S. PATENT DOCUMENTS 1,523,910 A * 1/1925 Sims ..................... F16K 15/025
137/906
3,548,868 A * 12/1970 Mullaney ................ F16K 17/04
137/543.13

(Continued)

FOREIGN PATENT DOCUMENTS

EP 2946748 A1 * 11/2015 ............. A61C 17/02
JP 2001218775 A 8/2001
(Continued)

OTHER PUBLICATIONS

International Search Report and Written Opinion Dated Sep. 1, 2020 For International Application No. PCT/EP2020/070938, Filed Jul. 24, 2020.

*Primary Examiner* — Bradley H Philips
*Assistant Examiner* — Tyler A Raubenstraw

(57) ABSTRACT

The present disclosure is directed to mechanisms for oral irrigator fluid channels which provide back flow prevention. The oral irrigator comprises: an irrigator tip; a tether having a first end and a second end, a third channel arranged between the first end and the second end, where the first end of the tether is in fluid communication with the second channel; a reservoir containing a fluid, the reservoir in fluid communication with a pump, the pump in fluid communication with the third channel and the second end of the tether; and an arrowhead check valve comprising a resilient element and an elastic head element, the arrowhead check (Continued)

valve arranged within the first channel, the second channel, or the third channel. The irrigator tip comprises: a nozzle comprising a first channel; and a handle comprising a second channel in fluid communication with the first channel.

17 Claims, 5 Drawing Sheets

(56)                References Cited

U.S. PATENT DOCUMENTS

| | | | | |
|---|---|---|---|---|
| 4,412,823 | A * | 11/1983 | Sakai | A61C 17/38 |
| | | | | 601/162 |
| 4,669,497 | A * | 6/1987 | Tenhengel | E03C 1/104 |
| | | | | 137/218 |
| 5,036,882 | A * | 8/1991 | Norcross | B01D 17/0214 |
| | | | | 210/136 |
| 5,820,373 | A * | 10/1998 | Okano | A61C 17/02 |
| | | | | 601/162 |
| 5,993,402 | A * | 11/1999 | Sauer | A61C 17/02 |
| | | | | 601/162 |
| 6,485,303 | B1 | 11/2002 | Goldman et al. | |
| 10,932,891 | B2 * | 3/2021 | Kovacevic-Milivojevic | |
| | | | | A61C 17/0202 |
| 10,952,813 | B2 * | 3/2021 | Benning | B05B 9/0861 |

| | | | | |
|---|---|---|---|---|
| 2003/0013063 | A1 * | 1/2003 | Goldman | A61C 3/025 |
| | | | | 601/162 |
| 2011/0117517 | A1 | 5/2011 | Bergheim et al. | |
| 2011/0207077 | A1 * | 8/2011 | Janssen | A61C 17/0217 |
| | | | | 433/88 |
| 2012/0277678 | A1 * | 11/2012 | Taylor | A61M 3/0258 |
| | | | | 604/153 |
| 2015/0147717 | A1 * | 5/2015 | Taylor | A61C 1/0092 |
| | | | | 433/80 |
| 2015/0148782 | A1 * | 5/2015 | Brown | A61C 19/063 |
| | | | | 604/514 |
| 2016/0131273 | A1 * | 5/2016 | Onishi | F17C 13/04 |
| | | | | 220/86.1 |
| 2017/0056142 | A1 * | 3/2017 | Baragona | A61C 17/0202 |
| 2017/0209234 | A1 * | 7/2017 | Senff | A61M 3/0258 |
| 2018/0153666 | A1 * | 6/2018 | Snyder | A61C 17/02 |
| 2018/0263742 | A1 * | 9/2018 | Taylor | A61Q 11/00 |
| 2018/0335154 | A1 * | 11/2018 | Jeon | B60T 15/36 |
| 2019/0195375 | A1 * | 6/2019 | Oswald | F16K 15/025 |
| 2022/0110731 | A1 * | 4/2022 | Liu | A61H 13/005 |

FOREIGN PATENT DOCUMENTS

| | | |
|---|---|---|
| JP | 2015217174 A | 12/2015 |
| JP | 2015217175 A | 12/2015 |
| KR | 20120088255 A | 8/2012 |
| KR | 101726718 B1 | 4/2017 |
| WO | 2018151359 A1 | 8/2018 |

* cited by examiner

ORAL IRRIGATOR WITH BACK FLOW PREVENTION

FIELD OF THE INVENTION

The present disclosure is directed to oral irrigators, and in particular, to mechanisms for oral irrigators to provide back flow prevention.

BACKGROUND

Oral irrigators use a pressurized fluid stream for interdental cleaning and plaque removal. The use of pressurized fluid, however, presents a means of potential contamination risk between multiple users of an oral irrigator. For example, when the irrigator is turned off, pressure from the fluid elevated in the nozzle creates a back-siphon, also called backflow, that can pull fluid from a user's mouth into the nozzle and further into the irrigator fluid pathway.

When backflow is present, fluid pulled into the fluid pathway will be flushed into a second user's oral cavity even if the irrigator nozzle is replaced between treatments. Fluid in a user's mouth can contain a combination of bodily fluids such as saliva and blood. Exposure to another individual's saliva and blood presents the risk of transmission of saliva or blood borne pathogens. Several pathogens are spread between people through the transmission of bodily fluids, the most common of which are HIV, Hepatitis B, and Hepatitis C. Contracting these pathogens can result in short term and long term health issues. Certain pathogens, specifically Hepatitis C, are capable of living outside a human host for prolonged periods and do not have immediate symptoms. As such, many who carry the pathogen are unaware they have been exposed until symptoms develop later in life. This makes Hepatitis C of particular risk for shared devices that are exposed to bodily fluids.

Transmission of blood borne pathogens typically requires direct blood-to-blood contact potentially through another non-living medium. Many who benefit from an oral irrigator already have poor gum health with bleeding gums which results in increased blood in the saliva. The presence of blood in the saliva can be increased by irrigator treatment. As such, the combination of poor gum health and oral irrigation increase the amount of blood in the oral cavity making transmission of blood between users through the product more likely. In addition, transmission of other pathogens, such as the common cold and flu, can occur through the transmission of saliva and mucous.

Accordingly, there is a continued need to prevent backflow in oral irrigators, especially in oral irrigators with removable nozzles which may be shared by multiple individuals.

SUMMARY OF THE INVENTION

The present disclosure is directed to mechanisms for oral irrigators to provide back flow prevention. The oral irrigator comprises a reservoir, pump, tether, irrigator handle, and irrigator nozzle. An arrowhead check valve comprising a resilient element and an elastic head element may be inserted in the irrigator nozzle, irrigator handle, or irrigator tether, to prevent backflow of contaminated fluid from a user's saliva or blood, especially when the nozzle is removed and the irrigator is shared between multiple users.

Generally, in an aspect, an oral irrigator system is provided. The oral irrigator system comprises: an irrigator tip; a tether having a first end and a second end, a third channel arranged between the first end and the second end, where the first end of the tether is in fluid communication with the second channel; a reservoir containing a fluid, the reservoir in fluid communication with a pump, the pump in fluid communication with the third channel and the second end of the tether; and an arrowhead check valve comprising a resilient element and an elastic head element, the arrowhead check valve arranged within the first channel, the second channel, or the third channel. The irrigator tip comprises: a nozzle comprising a first channel; and a handle comprising a second channel in fluid communication with the first channel.

In an aspect, the elastic head element comprises: an elongated portion having a first end and a second end; a frustoconical portion integrally connected to the elongated portion; and, a circular lip or a plurality of tabs integrally connected to the elongated portion.

In an aspect, the frustoconical portion of the elastic head element comprises a frustoconical surface arranged to contact and deform when in contact with an inner surface of the first channel, an inner surface of the second channel, or an inner surface of the third channel.

In an aspect, the circular lip or the plurality of tabs of the elastic head element comprise one or more surfaces facing the first end of the elongated portion, the one or more surfaces arranged to contact and deform when in contact with the resilient element.

In an aspect, a first portion of the elongated portion of the elastic head element is arranged within a cavity of the resilient element.

In an aspect, the nozzle is secured to the handle utilizing a clip, the clip having a first end and a second end and arranged to move from a first position to a second position, wherein in the first position the second end of the clip secures the nozzle.

In an aspect, the second channel further comprises a sealing member arranged within a second end of the handle.

Generally, in an aspect, a handle of an oral irrigator is provided. The handle comprises a channel in fluid communication with the handle, the channel comprising an arrowhead check valve comprising a resilient element and an elastic head element.

In an aspect, the elastic head element comprises: an elongated portion having a first end and a second end, wherein a first portion of the elongated portion is arranged within a cavity of the resilient element; a frustoconical portion, integrally connected to the elongated portion, comprising a frustoconical surface arranged to contact and deform when in contact with an inner surface of the channel; and, a circular lip or a plurality of tabs integrally connected to the elongated portion.

In an aspect, the circular lip or the plurality of tabs of the elastic head element comprise one or more surfaces facing the first end of the elongated portion, the one or more surfaces arranged to contact and deform when in contact with the resilient element.

In an aspect, the second channel further comprises a sealing member arranged within the first end of the handle.

In an aspect, the handle is arranged to secure a nozzle utilizing a clip, the clip having a first end and a second end, the clip arranged to move from a first position to a second position, wherein in the second position the second end of the clip secures the nozzle.

Generally, in an aspect, a nozzle of an oral irrigator is provided. The nozzle comprises a first channel in fluid communication with the nozzle, the first channel comprising an arrowhead check valve comprising a resilient element and an elastic head element.

In an aspect, the elastic head element comprises: an elongated portion having a first end and a second end and arranged within a cavity of the resilient element; a frustoconical portion, integrally connected to the elongated portion, comprising a frustoconical surface arranged to contact and deform when in contact with an inner surface of the first channel; and, a circular lip or a plurality of tabs integrally connected to the elongated portion.

In an aspect, the circular lip or the plurality of tabs of the elastic head element comprise one or more surfaces facing the first end of the elongated portion, the one or more surfaces arranged to contact and deform when in contact with the resilient element.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

The present disclosure is directed to mechanisms for oral irrigators to provide back flow prevention. The oral irrigator comprises a reservoir, pump, tether, irrigator handle, and irrigator nozzle. An arrowhead check valve comprising a resilient element and an elastic head element may be inserted in the irrigator nozzle, irrigator handle, or irrigator tether, to prevent backflow of contaminated fluid from a user's saliva or blood, especially when the nozzle is removed and the irrigator is shared between multiple users. The arrowhead check valve may comprise a resilient element, such as a spring, and an elastic head element, which further comprises: an elongated portion having a first end and a second end; a frustoconical portion integrally connected to the elongated portion; and, a circular lip or a plurality of tabs integrally connected to the elongated portion. Applicant has recognized and appreciated that it would be beneficial to provide a mechanism to control backflow of contaminated fluid, especially when more than one person uses the oral irrigator, from the nozzle to the fluid channel, when, for example, the oral irrigator is turned off.

Figure 1:
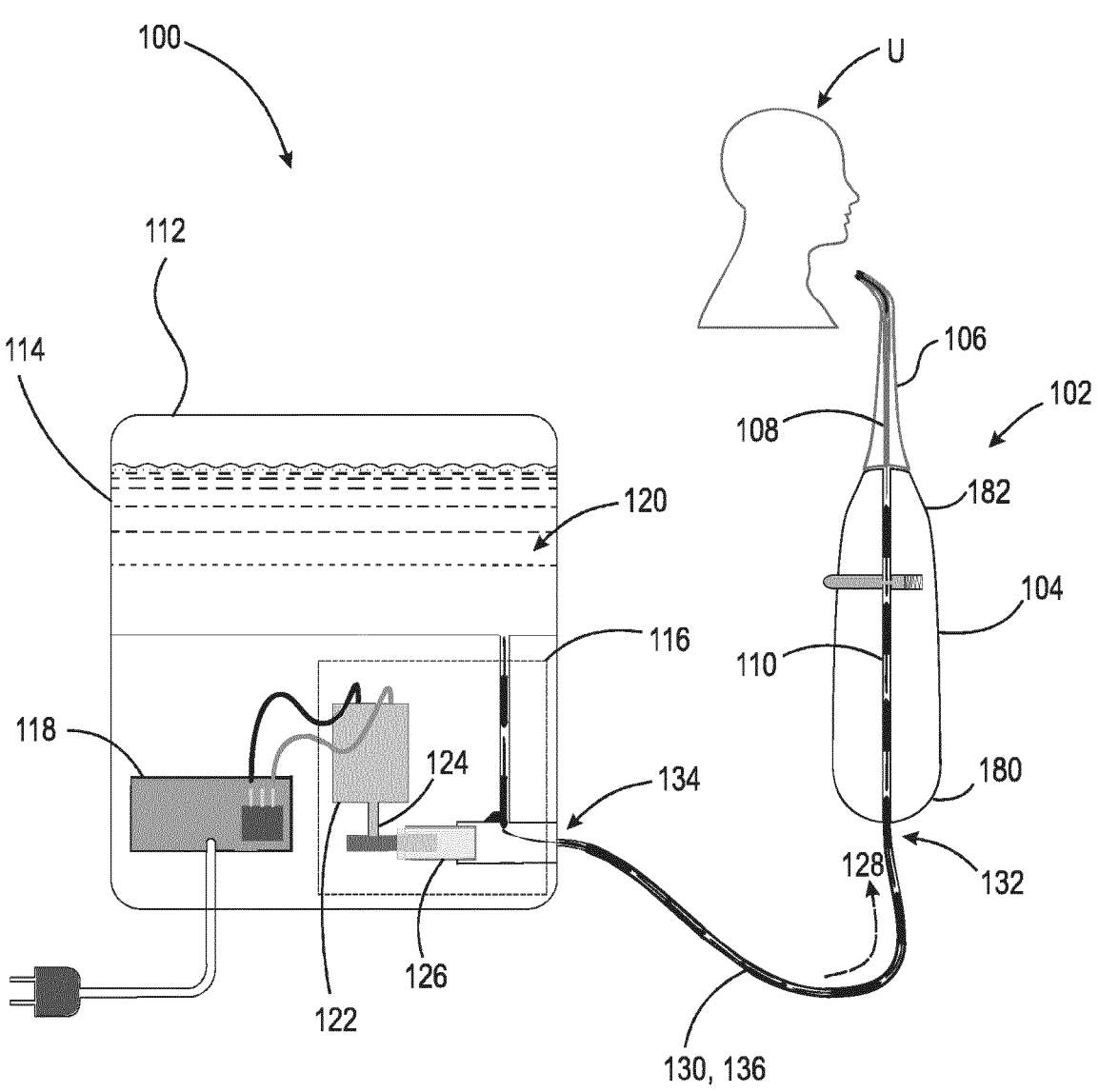
FIG. 1 is a schematic representation of an oral irrigator according to aspects of the present disclosure.

Referring to the figures, FIG. 1 is a schematic illustration of an oral irrigator system 100. Oral irrigator 100 includes irrigator tip 102 having a handle 104 and a nozzle 106. Irrigator tip 102 further includes a first channel 108, which extends within and through the nozzle portion 106, and second channel 110, which extends within the handle 104 and is in fluid communication with the first channel 108. Oral irrigator 100 further includes housing 112 which contains reservoir 114, pump 116, and power supply 118. Reservoir 114 contains a volume of fluid 120 which during operation of oral irrigator 100 is directed through irrigator tip 102 into the mouth of user U. Pump 116 comprises motor 122, crank 124, and piston 126. Motor 122, crank 124, and piston 126 work in concert to create a pressurized environment that facilitates flow 128 from reservoir 114, through tether 130, into irrigator tip 102 and into user U's mouth.

Tether 130 is a substantially hollow, flexible tube, having a first end 132 and a second end 134. A third channel 136 is arranged between the first end 132 and the second end 134 of the tether 130. The first end 132 of tether 130 is fixedly secured to the handle 104 of the irrigator tip 102 and in fluid communication with the second channel 110, and the second end 134 of tether 130 is fixedly secured to pump 116 and in fluid communication with the pump 116. The third channel 136 is in fluid communication with the second channel 110, and the pump 116 is in fluid communication with the third channel 136. Tether 130 functions as a conduit through which flow 128 of fluid 120 proceeds from reservoir 114 to irrigator tip 102 and into user U's mouth for cleaning, through the first channel 108, the second channel 110, and the third channel 136. Fluid 120 can be selected from, for example, water, a water-gas mixture, oral cleansing concentrate, standard or antiseptic (alcohol based) mouthwash, or any fluid 120 with a viscosity low enough to proceed through the first channel 108, the second channel 110, and third channel 136.

Figure 2A:
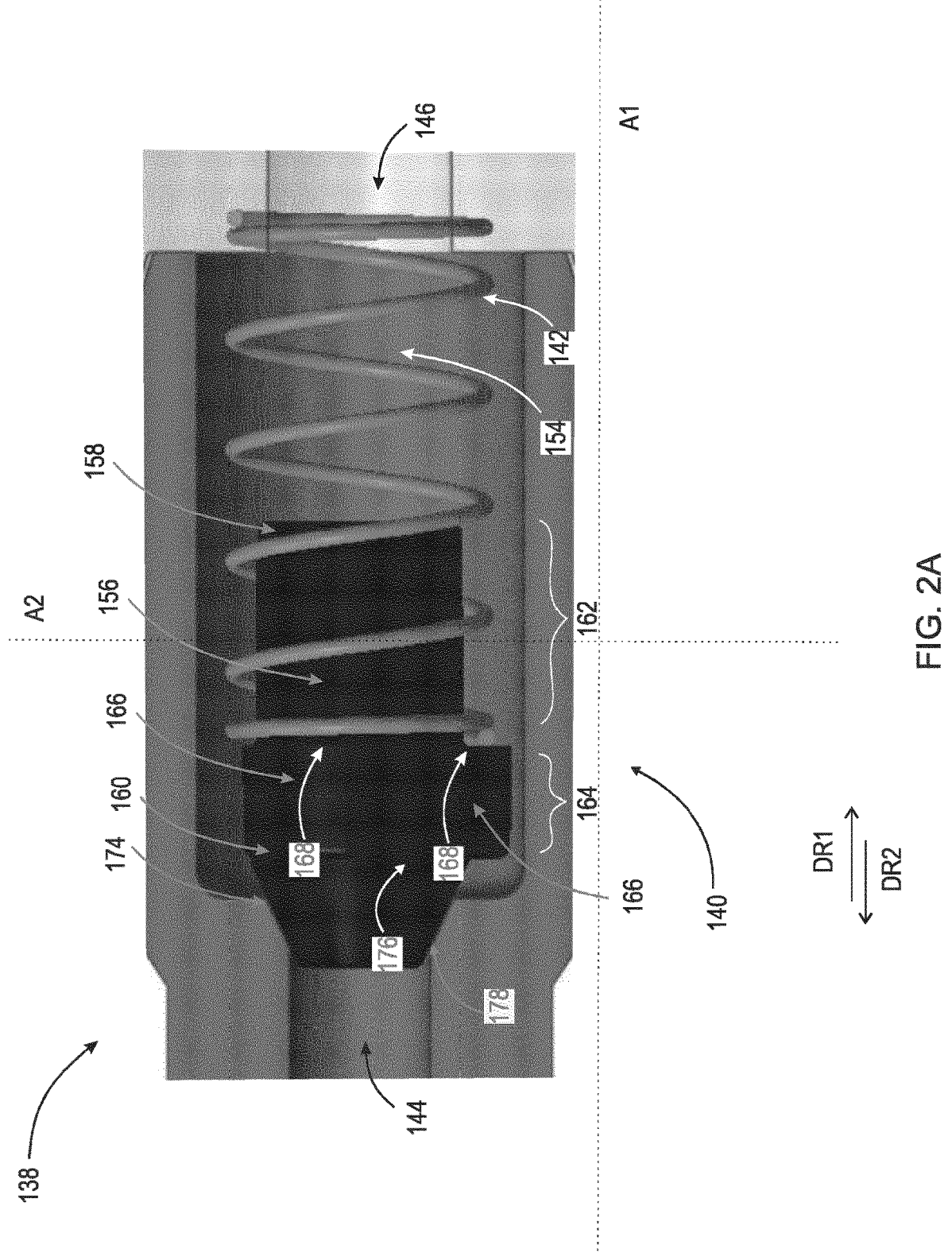
FIG. 2A is schematic representation of an arrowhead check valve according to aspects of the present disclosure.
Figure 2B:
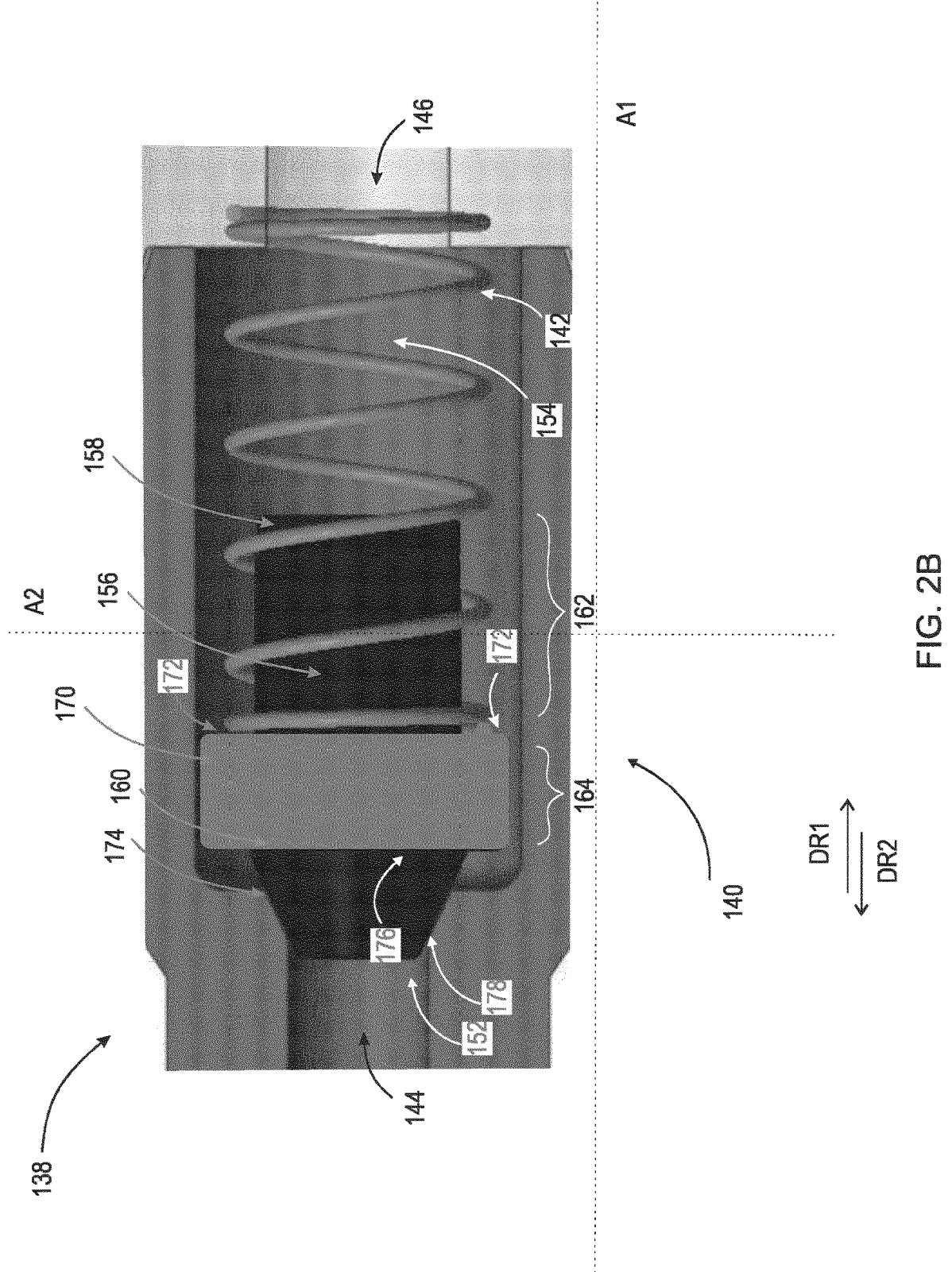
FIG. 2B is schematic representation of an arrowhead check valve according to aspects of the present disclosure.
Figure 3:
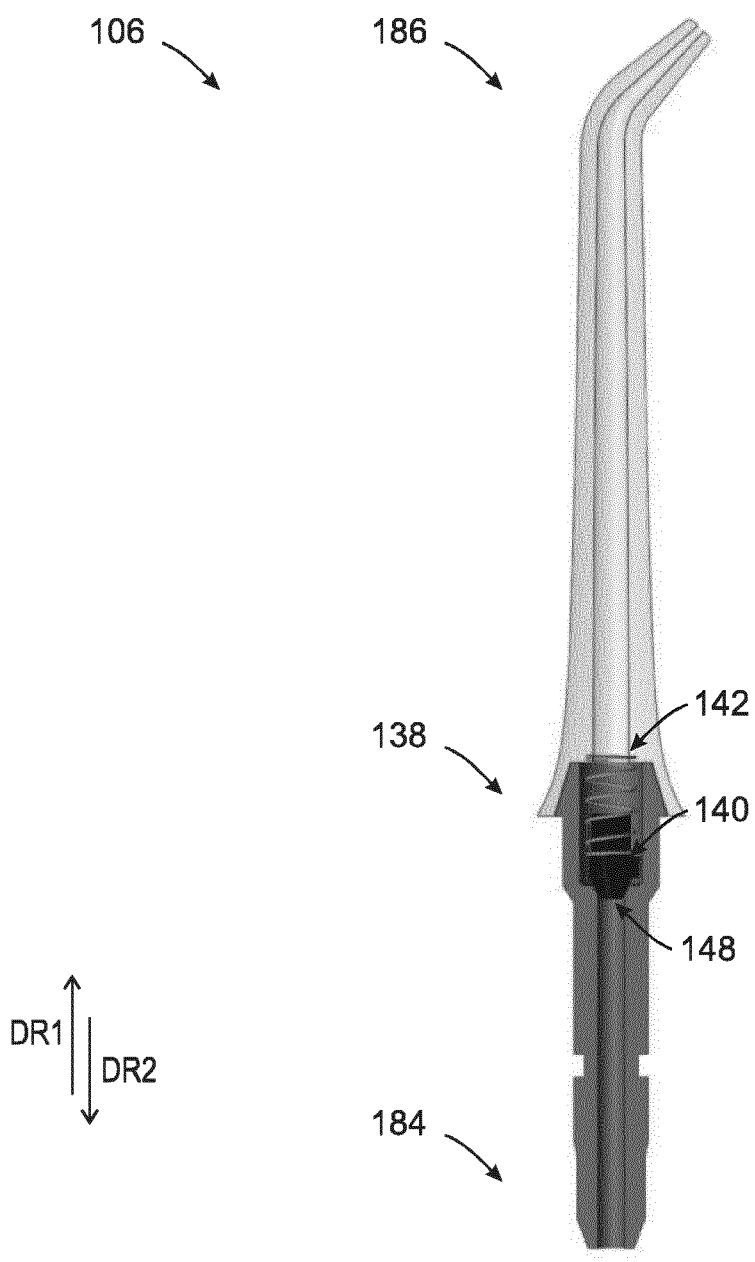
FIG. 3 is arrowhead check valve in in nozzle of an oral irrigator according to aspects of the present disclosure.

Referring to FIGS. 2A and 2B, the oral irrigator system 100 further comprises an arrowhead check valve 138 comprising an elastic head element 140 and a resilient element 142. The arrowhead check valve 138 has an inlet 144 and an outlet 146 to allow fluid 120 to flow 128 through the valve 138 when the valve 138 is open and when the flow 128 provides enough pressure to open the valve 138. The arrowhead check valve 138 may be arranged, for example, within the first channel 108, with the second channel 110, or within the third channel 136 (shown in FIG. 1). When there is not enough pressure created by the flow 128 of the fluid 120, the elastic head element 140 seals the flow 128 by making contact, for example, with an inner surface 148 (shown in FIG. 3) of the first channel 108, an inner surface 150 (shown in FIG. 4) of the second channel 110, or an inner surface 152 (shown in FIG. 2B) of the third channel 136. If the arrowhead check valve 138 is placed in the nozzle 106, removal of the nozzle 106 removes the potentially contamination fluid from the system. Placing the arrowhead check valve 138 in the nozzle also eliminates the risk for diffusion of bodily fluids through the fluid channels. By placing the arrowhead check valve 138 in handle 104 of the irrigator tip 102, the portion of fluid pathway that is at risk for cross contamination due to diffusion or from spilled fluid during nozzle 106 removal is reduced. As an example, arrowhead check valve 138 is placed in the handle 104 of the oral irrigator 100 as close to the nozzle 106 as possible. It should be appreciated that alternative locations for placement of the arrowhead check valve 138 in the handle 104 may also be utilized.

As an example, the resilient element 142 is a spring, having a cavity 154 through the center of the spring 142 which lies along a first axis A1. The elastic head element 140 further comprises an elongated portion 156, having a first end 158 and a second end 160, which extends along the first axis A1. A first portion 162 of the elongated portion 156, which begins at the first end 158 of the elongated portion 156, is arranged within the cavity 154 of the resilient element 142. A second portion 164 of the elongated portion 156 extends from the first portion 162 to the second end 160 of the elongated portion 156. As an example, adjacent to the second end 160 of the elongated portion 156 are a plurality of tabs 166 (shown in FIG. 2A). The plurality of tabs 166 extend along the second axis A2 which are orthogonal to the first axis A1. Each tab of the plurality of tabs 166 has a surface 168 which faces the first end 158 of the elongated portion 156. Each surface 168 of each tab of the plurality of tabs 166 makes contact with the resilient element 142. As another example, adjacent to the second end 160 of the elongated portion 156, along a second axis A2, which is orthogonal to the first axis A1, is a circular lip 170 (shown in FIG. 2B). The circular lip 170 has a surface 172 which faces the first end 158 of the elongated portion 156, where the surface 172 makes contact with the resilient element 142.

Adjacent to the second end 160 of the elongated portion 156 is a frustoconical portion 174 of the elastic head element 140. The frustoconical portion 174 has a first surface 176 which connects with the second end 160 of the elongated portion 156 and a frustoconical surface 178. The frustoconical surface 178 is arranged to contact and deform when in contact with an inner surface 148 of the first channel 108 (shown in FIG. 3), an inner surface 150 of the second channel 110 (shown in FIG. 4), or an inner surface 152 of the third channel 136 (shown in FIG. 2B), depending on where the arrowhead check valve 138 is located, for example, in the nozzle 106 of the oral irrigator 100, in the handle 104 of the oral irrigator 100, or in the tether 130 of the oral irrigator 100.

Referring to FIG. 1, when fluid 120 flows 128 through the oral irrigator 100, it flows 128 from the pump 116 to the second end 134 of the tether 130 and to the first end 132 of the tether 130 through the third channel 136. Fluid 120 then flows 128 from the first end 180 of the handle 104 to the second end 182 of the handle 104 through the second channel 110. The fluid 120 then flows from the first end 184 of the nozzle 106 to the second end 186 of the nozzle 106 through the first channel 108 (shown in FIG. 3) and into the user U's mouth. As an example, arrowhead check valve 138 is arranged in the handle 104 of the oral irrigator 100. When fluid 120 flows from the first end 180 of the handle 104 to the second end 182 of the handle 104, the fluid 120 creates a force in the first direction DR1 through the second channel 110. This force moves the elastic head element 140 in the first direction DR1. The elastic head element 140, which was previously in contact with an inner surface of the second channel 150 and blocking flow 128, is moved in the first direction DR1, which opens the second channel 110 for fluid 120 flow 128. The force in the first direction DR1 is also applied to the resilient element 142, which may be, for example, a spring. The elastic head element 140 is in contact with the resilient element 142 via one or more surfaces 168 of the plurality of tab 166 or a surface 172 of the circular lip

170. The force on the elastic head element 140 and the fluid 120 flow 128 through the second channel 110 compresses the resilient element 142.

When fluid 120 flow 128 through the second channel 110 is stopped or reduced, for example, because the oral irrigator 100 has been turned off, and the force on the elastic head element 140 and due to the fluid 120 flow 128 in the DR1 direction is less than the force from the compressed resilient element 142 in the second DR2, which is opposite the first direction DR1, the resilient element 142 will decompress and move the elastic head element 140 so that its frustoconical surface 178 makes contact with an inner surface of the second channel 150. The contact between the resilient element 142 and the elastic head element 140 via the surfaces 168 of the plurality of tabs 166 (shown in FIG. 2A) or surface 172 of the circular lip 170 (shown in FIG. 2B) provides for an even distribution of pressure on the elastic head element 140 by the resilient element 142, so that the elastic head element 140 does not deform when the valve is closed and a good seal is made between the frustoconical portion 174 and the inner surface of the second channel 150. Additionally, the arrangement of the first portion 162 of the elongated portion 156 of the elastic head element 140 within a cavity 154 of the resilient element 142 allows for the elastic head element 140 to remain aligned as the valve is opened and closed, which provides for a tight seal and prevents leaks. This arrangement of the arrowhead check valve 138 make the valve self-sealing to prevent backflow in the event the oral irrigator 100 is turned off before the risk of backflow is removed, for example, by a user U removing the nozzle 106 from the mouth.

Figure 4:
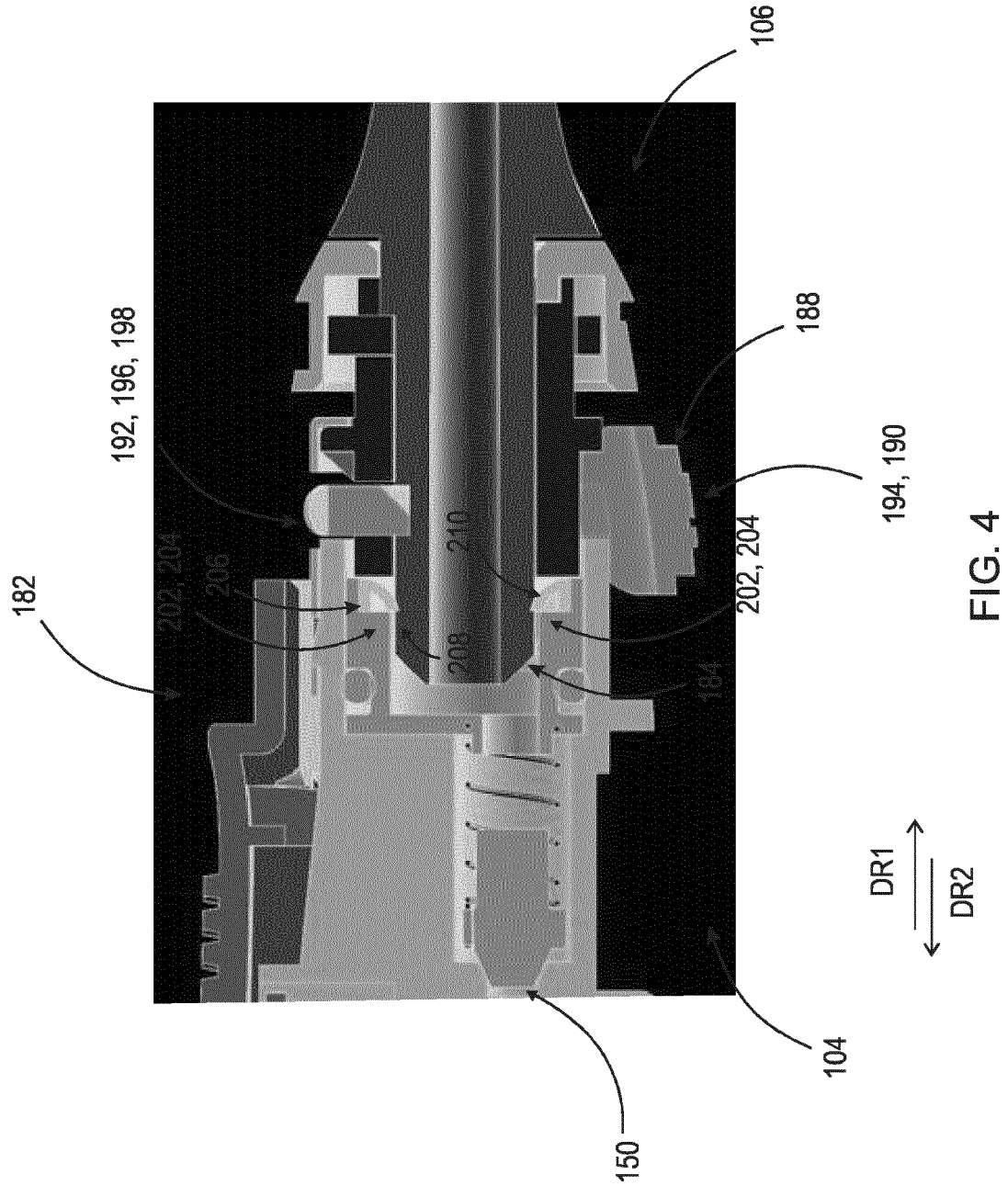
FIG. 4 is arrowhead check valve in handle of an oral irrigator according to aspects of the present disclosure.

Referring to FIG. 4, the nozzle 106 of the oral irrigator 100 is detachable and connected to the handle 104 of the oral irrigator 100 via a clip 188. The clip 188 has a first end 190 and a second end 192. On the first end 190 of the clip 188 there is a contact surface 194 which a user U can utilize to attach and detach the nozzle 106. The clip 188 comprises an elongated portion 156, which extends from the first end 190 of the clip 188 to the second end 192 of the clip 188, and a clipping portion 196 on the second end 192. The clipping portion 196 engages with the nozzle 106 of the oral irrigator 100 to secure it to the handle 104, when the clip 188 is in a first position 198 and disengages from the nozzle 106 when the clip 188 is in the second position 200 (not shown in Figures). The second end 182 of the handle 104 additionally contains a sealing member 202 which is arranged at least partially within the second channel 110 and arranged to contact the nozzle 106 of the oral irrigator 100. The sealing member 202 prevents the fluid 120 from flowing out of the second channel 110 or the first channel 108 when the nozzle 106 is connected to the handle 104. The sealing member 202 may be, for example, a diaphragm type sealing member 204 which has a circumferential lip 206 in contact with the inner surface of the second channel 110 and a frustoconical lip 210 which is arranged to contact an outer surface 208 of the nozzle 106.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. As used herein in the specification and in the claims, "or" should be understood to have the same meaning as "and/or" as defined above.

It should also be understood that, unless clearly indicated to the contrary, in any methods claimed herein that include more than one step or act, the order of the steps or acts of the method is not necessarily limited to the order in which the steps or acts of the method are recited.

The invention claimed is:

1. An oral irrigator system comprising: an irrigator tip, the irrigator tip comprising: a nozzle comprising a first channel; a handle comprising a second channel in fluid communication with the first channel; a tether having a first end and a second end, a third channel arranged between the first end and the second end, the first end of the tether in fluid communication with the second channel; a reservoir containing a fluid, the reservoir in fluid communication with a pump, the pump in fluid communication with the third channel and the second end of the tether; and an arrowhead check valve comprising a resilient element and an elastic head element, the arrowhead check valve arranged within the first channel, the second channel, or the third channel, wherein the elastic head element comprises: an elongated portion having a first end and a second end, wherein a first portion of the elongated portion of the elastic head element is arranged within a cavity of the resilient element, wherein the cavity of the resilient element is defined by and located within a bounds of the resilient element; and wherein the circular lip or the plurality of tabs of the elastic head element comprise one or more surfaces facing the first end of the elongated portion, the one or more surfaces arranged to contact and deform when in contact with the resilient element.

2. The oral irrigator system of claim 1, wherein the elastic head element further comprises: a frustoconical portion integrally connected to the elongated portion; and a circular lip or a plurality of tabs integrally connected to the elongated portion.

3. The oral irrigator system of claim 2, wherein the frustoconical portion of the elastic head element comprises a frustoconical surface arranged to contact and deform when in contact with an inner surface of the first channel, an inner surface of the second channel, or an inner surface of the third channel.

4. The oral irrigator system of claim 1, wherein the nozzle is secured to the handle utilizing a clip, the clip having a first end and a second end and arranged to move from a first position to a second position, wherein in the first position the second end of the clip secures the nozzle.

5. The oral irrigator system of claim 1, wherein the second channel further comprises a sealing member arranged within a second end of the handle.

6. The oral irrigator system of claim 1, wherein the resilient element is a spring.

7. A handle of an oral irrigator, the handle comprising a channel in fluid communication with the handle, the channel comprising an arrowhead check valve comprising a resilient element and an elastic head element, wherein the elastic head element comprises: an elongated portion having a first end and a second end, wherein a first portion of the elongated portion of the elastic head element is arranged within a cavity of the resilient element; wherein the cavity of the resilient element is defined by and located within a bounds of the resilient element; and wherein the circular lip or the plurality of tabs of the elastic head element comprise one or more surfaces facing the first end of the elongated portion, the one or more surfaces arranged to contact and deform when in contact with the resilient element.

8. The handle of claim 7, wherein the elastic head element further comprises: a frustoconical portion integrally connected to the elongated portion; and a circular lip or a plurality of tabs integrally connected to the elongated portion.

9. The handle of claim 8, wherein the channel further comprises a sealing member arranged within the first end of the handle.

10. The handle of claim 7, wherein the handle is arranged to secure a nozzle utilizing a clip, the clip having a first end and a second end, the clip arranged to move from a first position to a second position, wherein in the second position the second end of the clip secures the nozzle.

11. The handle of claim 8, wherein the frustoconical portion of the elastic head element comprises a frustoconical surface arranged to contact and deform when in contact with an inner surface of the channel.

12. The handle of claim 7, wherein the resilient element is a spring.

13. A nozzle of an oral irrigator, the nozzle comprising a first channel in fluid communication with the nozzle, the first channel comprising an arrowhead check valve comprising a resilient element and an elastic head element, wherein the elastic head element comprises: an elongated portion having a first end and a second end, wherein a first portion of the elongated portion of the elastic head element is arranged within a cavity of the resilient element; wherein the cavity of the resilient element is defined by and located within a bounds of the resilient element; and wherein the circular lip or the plurality of tabs of the elastic head element comprise one or more surfaces facing the first end of the elongated portion, the one or more surfaces arranged to contact and deform when in contact with the resilient element.

14. The nozzle of claim 13, wherein the elastic head element further comprises: a frustoconical portion integrally connected to the elongated portion; and a circular lip or a plurality of tabs integrally connected to the elongated portion.

15. The nozzle of claim 14, wherein the frustoconical portion of the elastic head element comprises a frustoconical surface arranged to contact and deform when in contact with an inner surface of the first channel.

16. The nozzle of claim 13, wherein the nozzle is configured to be secured to a handle utilizing a clip, the clip having a first end and a second end and arranged to move from a first position to a second position, wherein in the first position the second end of the clip secures the nozzle.

17. The nozzle of claim 13, wherein the resilient element is a spring.

* * * * *